United States Patent [19]
Gedzjun et al.

[11] 3,787,721
[45] Jan. 22, 1974

[54] HIGH-VOLTAGE CAPACITOR

[76] Inventors: Vladislav Aloizovich Gedzjun, ulitsa Olminskogo, 16, kv. 50; Petr Antipovich Yakovlev, ulitsa Vavilovykh, 15, korpus 1, kv. 21, both of Leningrad, U.S.S.R.

[22] Filed: Oct. 24, 1972

[21] Appl. No.: 300,304

[52] U.S. Cl. ................................. 317/242, 317/243
[51] Int. Cl. ............................................ H01g 1/08
[58] Field of Search ............................. 317/242, 317/243, 339/258 A, 112 R 338/332

[56] References Cited
UNITED STATES PATENTS

| | | | |
|---|---|---|---|
| 1,870,141 | 8/1932 | Regerbis | 317/242 |
| 2,448,407 | 8/1948 | Antalek | 317/243 X |
| 2,762,989 | 9/1954 | Johnson | 339/258 A |
| 2,935,666 | 5/1960 | Van Namen | 339/112 R |
| 3,416,207 | 12/1968 | Naida | 317/242 |

FOREIGN PATENTS OR APPLICATIONS 460,281 7/1945 Canada ............................... 338/332

Primary Examiner—E. A. Goldberg
Attorney, Agent, or Firm—John C. Holman et al.

[57] ABSTRACT

A high-voltage capacitor of high reactive power is disclosed said capacitor comprising a tube made from a dielectric material with an outward and an inward insulating projections and an external and an internal plates connected to leads on the outer surface of said tube the leads being in the form of flanges with contact plates.

1 Claim, 3 Drawing Figures

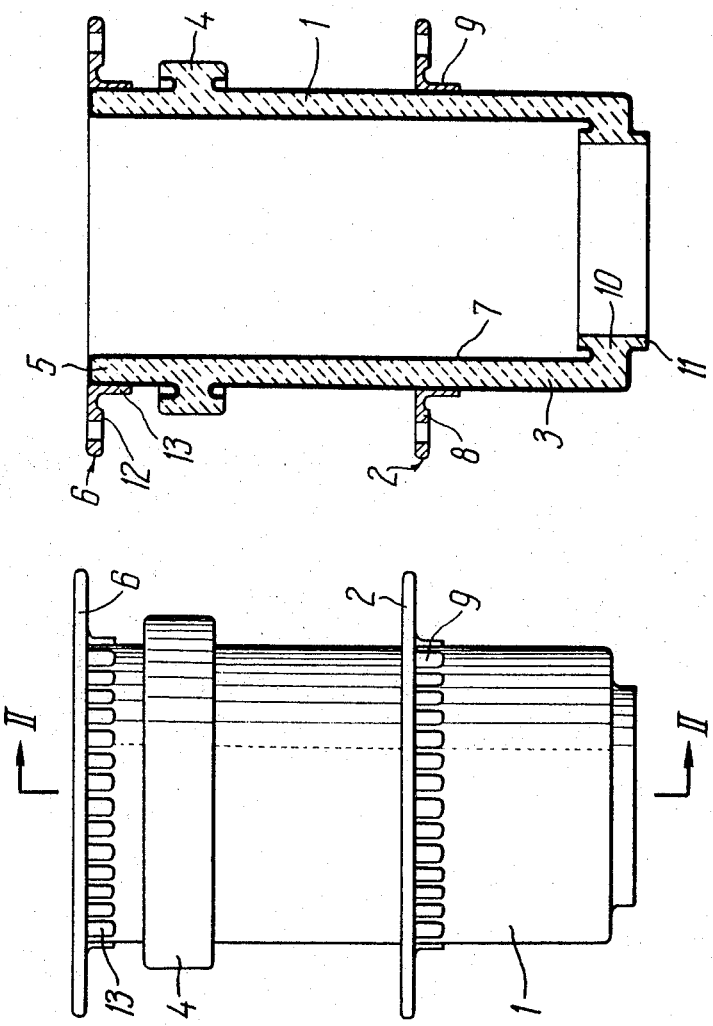

3,787,721

HIGH-VOLTAGE CAPACITOR

BACKGROUND OF THE INVENTION

The present invention relates to electric capacitors, and more particularly to a high-voltage capacitor of high reactive power.

Known in the art are high-voltage capacitors of high reactive power comprising a tube made from a dielectric material.

In these prior-art high-voltage capacitors of high reactive power, there are two insulating projections arranged circumferentially on the surface of said tube and metal plates deposited onto both the inner and the outer surface of the tube, each plate being connected to a lead.

A disadvantage of the prior-art high-voltage capacitors of high reactive power is that the lead of the metal plate deposited onto the inner surface of the ceramic tube is in the form of a band, a rod, or a truncated cone and is housed in the tube which involves difficulties in removing heat from the inner surface of the tube and is responsible for a low current-carrying capacity. This is why the prior-art capacitors have a relatively low reactive power.

Another disadvantage of the prior-art capacitors is that the frequency range within which they operate under maximum reactive power conditions is rather narrow because an increase in frequency caused by the skin effect results in heating of the metal leads which in turn increases the temperature of the whole capacitor, thus reducing its reactive power.

SUMMARY OF THE INVENTION

It is an object of the present invention to provide a capacitor, wherein the leads of the capacitor would remove heat from the inner surface of the tube made from a dielectric material.

Another object of the invention is to provide a capacitor with high current-carrying capacity and reactive power.

Yet another object of the invention is to provide a high-voltage capacitor operating within a wide frequency range.

With these and other objects in view, the present invention comprises a high-voltage capacitor, wherein a tube made from a dielectric material has two insulating projections arranged circumferentially thereon and metal plates are deposited onto the inner and outer surfaces of the tube, each plate being connected to a lead, and, according to the invention, one of the insulating projections is arranged circumferentially on the outer surface of said tube in direct proximity to its first end while the second insulating projection is arranged circumferentially on the inner surface of the tube in direct proximity to the second end thereof, and the metal plate deposited onto the inner surface of the tube is brought out through the second end to the outer surface reaching the first insulating outward projection and is connected, over this length, through contact plates to a lead made in the form of a flange while the other lead, also in the form of a flange, is connected through contact plates to the metal plate deposited on the outer surface of the tube between the first end of the tube and the second insulating inward projection.

BRIEF DESCRIPTION OF THE DRAWINGS

Other objects and advantages of the invention will hereinafter become more fully apparent from the following description in which the preferred embodiment is set forth in detail in conjunction with the accompanying drawings wherein:

FIG. 1 is a lateral view of a high-voltage capacitor according to the invention;

FIG. 2 is a sectional view of the capacitor shown in FIG. 1 taken along the line II—II;

DETAILED DESCRIPTION OF THE PREFERRED EMBODIMENT

Figure 3:
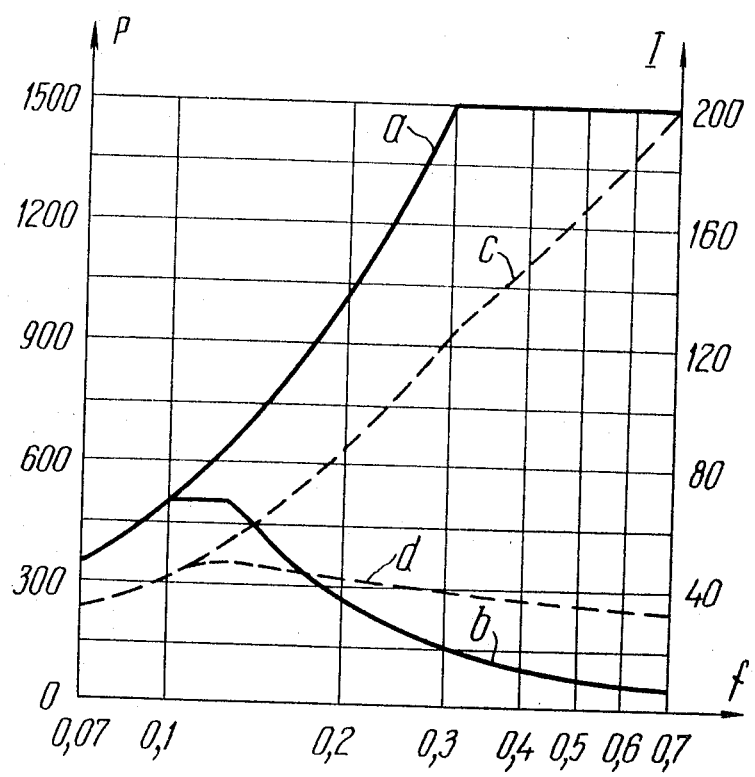
FIG. 3 is a graph showing the relationship between the reactive power and current on the one hand and the operating frequency of both the prior-art and novel capacitors on the other.

Referring to FIGS. 1 and 2, the high-voltage capacitor comprises a ceramic tube 1 (FIG. 1) with a lead 2 on its outer surface connected to an external metal plate 3 (FIG. 2), an insulating outward projection 4 in proximity to an end 5 of the tube 1 the distance between them approximately equal to the width of the projection 4, and a lead 6 connected to an internal metal plate 7 of the ceramic tube 1. The metal plate 3 is deposited by firing silver paste on the ceramic surface of the tube and the lead 2 is made in the form of a flange 8 secured by contact plates 9. Disposed on the inner surface of the tube 1 in direct proximity to an end 11 is an insulating inward projection 10 and the internal metal plate 7 deposited by firing silver paste on the inner surface of the tube is brought out to the outer surface through the end 5 reaching the insulating outward projection 4. Thus, the internal metal plate 7 is connected to the lead 6 also made in the form of a flange 12 and secured by contact plates 13.

FIG. 3 shows the relationships between:

curve a- the reactive power, in kW, and the operating frequency, in MHz, of the novel high-voltage capacitor;

curve b- the reactive power, in kW, and the operating frequency, in MHz, of the prior-art high-voltage capacitor;

curve c- the amperage and the operating frequency, in MHz, of the novel high-voltage capacitor;

curve d- the amperage and the operating frequency, in MHz, of the prior-art high-voltage capacitor.

The novel high-voltage capacitor of high reactive power will find extensive application in radio equipment. It is particularly recommended for use in high-frequency electro thermal installations. When such a capacitor operates in the oscillation circuit of a high-frequency installation, it is loaded by a reactive power $P_1$, $$P_1 = U^2 2\pi f C$$

where $U$ is the voltage between the plates 3 and 7 (FIG. 2) of the capacitor, V;

$f$ is the operating frequency, Hz;

$P_1$ is the reactive power, VA;

$C$ is the capacitance of the capacitor, F.

The heating of the capacitor is a function of the reactive power and the dissipation of heat conditions, and it is determined by active losses of power $P_2$ throughout the dielectric material of the tube 1 (FIG. 1) proportional to the dielectric loss tangent tg δ, i.e.

$$P_2 = P_1 \cdot \mathrm{tg}\, \delta$$

and by losses of power $P_3$ across the metal elements of the capacitor as the square of the current-carrying capacity and the resistance of the metal elements, i.e.

$$P_3 = I^2 R$$

where

*I* is the current-carrying capacity, A;

*R* is the resistance of the leads 2 and 6 (FIG. 2), in Ohms.

The novel capacitor offers an improvement in the heat-dissipation conditions at the inner surface of the tube 1 (FIG. 1), as well as an abatement of ohmic heating of the leads 2 and 6 (FIG. 2) caused by the skin effect produced by an increase in frequency.

The novel capacitor makes it possible to minimize the resistance of the leads 2 and 6. This is achieved by that the leads 2 and 6 are made in the form of said flanges 8 and 12 and the lead 6 from the internal plate 7 is disposed on the outer surface of the tube 1. Low resistance of the leads 2 and 6 and, consequently, of the capacitor contact plates connecting it to the oscillation circuit determines a high current-carrying capacity exceeding that of the prior-art capacitors, at a frequency of 600 kHz, more than 5 times (FIG. 3, curves *c* and *d*).

The heating of the novel capacitor elements when loaded by reactive power is abated as compared to that of the prior-art capacitors, thus increasing the admissible reactive power of the novel capacitor at least threefold as compared to that of the prior-art capacitors.

When compared to the prior-art capacitors, the novel capacitor has also a wider operating frequency range within which maximum reactive power can be maintained the leads 2 and 6 (FIG. 2) exerting almost no influence on the intensity of heating.

Thus, the reactive power of the novel capacitor within a frequency range of 100 to 200 kHz does not exceed 500 kW (FIG. 3), curve *b* falling sharply when the frequency increases while the reactive power at 300 kHz is 1,500 kW (FIG. 3), curve *a* and remains unchanged even as the frequency increases.

The high-voltage capacitor of high reactive power can be employed in high-frequency circuits of transceivers operating in the medium-wave band, as well as in high-frequency oscillators of electric welders.

The use of the novel capacitor in electric welders allows for trimming their size and weight and improving the quality factor of the high-frequency circuits thereof thus reducing the consumption of energy and increasing their effectivity.

We claim:

1. A high voltage capacitor comprising: a tube made from a dielectric material; an insulating outward projection arranged circumferentially on the outer surface of said tube in proximity to its first end; an insulating inward projection arranged circumferentially on the inner surface of said tube in direct proximity to its second end; an internal metal plate disposed onto the inner surface of said tube between said insulating inward projection and said first end of said tube and brought out through said first end of said tube to the outer surface of said tube reaching said insulating outward projection; an external metal plate disposed onto the outer surface of said tube between said insulating outward projection and said second end of said tube; first contact plates contiguous to said internal metal plate between said first end of said tube and said insulating outward projection; a lead in the form of a flange connected by means of said first contact plates to said internal metal plate between said first end of said tube and said insulating outward projection; second contact plates contiguous to said external metal plate; and another lead in the form of a flange connected by means of said second contact plates to said external metal plate.

* * * * *